(No Model.)

E. A. HILL.
SHAFT HANGER.

No. 524,549. Patented Aug. 14, 1894.

Witnesses
Ralph C. Enyart.
Walker F. Murray.

Inventor
Edwin A. Hill
By Geo. F. Murray
his Atty

UNITED STATES PATENT OFFICE.

EDWIN A. HILL, OF JACKSON, MISSISSIPPI, ASSIGNOR TO THE ENOCHS LUMBER AND MANUFACTURING COMPANY, OF SAME PLACE.

SHAFT-HANGER.

SPECIFICATION forming part of Letters Patent No. 524,549, dated August 14, 1894.

Application filed December 1, 1893. Serial No. 492,414. (No model.)

*To all whom it may concern:*

Be it known that I, EDWIN A. HILL, a citizen of the United States, and a resident of Jackson, in the county of Hinds and State of Mississippi, have invented certain new and useful Improvements in Shaft-Hangers, of which the following is a specification.

The object of my invention is to provide a hanger for counter shafts, or shafts carrying guide pulleys, that can be so placed in a mill as to allow the machinery to be placed in any desired position with reference to the line shaft, and allow ample space, not occupied by the machines, and belt, for the material and the passage of trucks used in handling the same. In carrying out this object I employ a rigid hanger adapted to be secured to the frame timbers of the building, either above or below the floor upon which the machine to receive the belt is situated, and connect to the rigid hanger an adjustable or swinging member carrying the bearings for the shaft or shafts, in order that the member carrying the bearings may be adjusted with relation to the stationary member, so as to swing the adjustable member into position to receive the belt in any desired direction, and in addition to performing its functions as a guide pulley or counter shaft, act as a tightening device for adjusting the tension of the belt.

The invention will be first fully described in connection with the accompanying drawings and then particularly referred to and pointed out in the claims.

Figure 1:
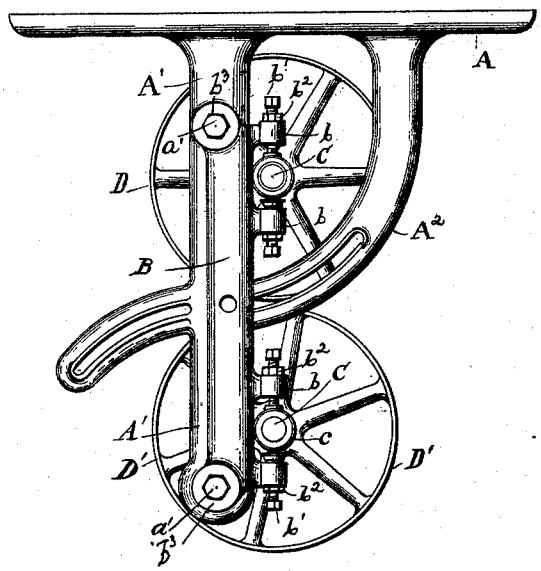
Figure 2:
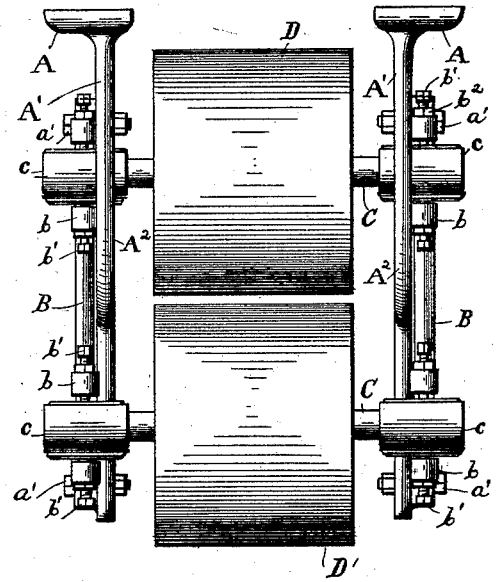
Figure 3:
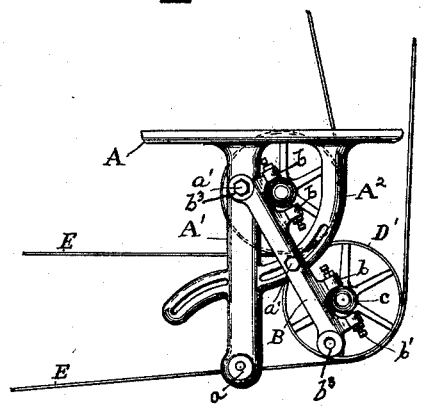

Referring to the drawings, in which like parts are represented by similar reference letters wherever they occur throughout the various views: Figure 1 is a side elevation of my improved hanger with the guide pulleys mounted therein, the said pulleys being arranged in the ordinary position when used merely as a belt guide. Fig. 2 is a front elevation of the same. Fig. 3 is a side elevation with the adjustable member swinging outwardly upon its upper bearing, and Fig. 4 a similar view with the adjustable member swinging outwardly upon its lower bearing.

In all the views shown, the hanger supports guide pulleys for directing the belt from the main to the counter shaft, but it is obvious that the same shafts may be used as a counter shaft for increasing or diminishing the speed by simply placing two pulleys of different diameters upon the shaft hung in the adjustable bearings. The change being merely mechanical, it is not deemed necessary to illustrate the adjustable member fitted with two pulleys of different diameters, instead of two pulleys of the same diameter mounted upon different shafts. The rigid member consists of the attaching plate A, the vertical depending member A' and the curved member $A^2$, which are preferably molded in a single piece. The adjustable swinging member B is preferably a straight bar provided with perforated bosses, $b^3$, at each end and having lugs $b$ projecting at right angles on one side, the lugs $b$ terminating in perforated bosses adapted to receive cone pointed set screws $b'$, which pass through the bosses and hold the bearings $c$ of the shafts C in position. The set screws are provided with locknuts, so that when the bearings are aligned to receive the shafts, the locknuts $b^2$ may be tightened down upon the bosses to rigidly hold the bearings in position. The vertical portion A' of the fixed hanger has perforated bosses $a$, the bosses on both members being dressed off true on their contacting faces, and the perforations in the bosses $a$ and $b^3$ registering truly when placed in the position shown in Fig. 1, so that the fastening bolts $a'$ passed in through both of the bosses, as shown in Fig. 1, will hold the adjustable and rigid parts firmly together. The curved arm $A^2$ of the rigid member is slotted upon one side of the vertical member A' concentric with the upper connecting bolt $a'$, and upon the opposite side concentric with the lower fastening bolt $a'$. The adjustable arm B is centrally perforated to receive a tightening bolt, which may pass through the slot in the curved arm $A^2$. As seen in Fig. 3, the lower bolt $a'$ is removed, the adjustable member B swung outward from the arm, and the bolt (which may be the same bolt $a'$) passed through the central perforation in the arm B, through the slot in the arm $A^2$ and tightened up to hold the shafts with their pulleys D and D' in the position shown in Fig. 3. Or the upper bolt $a'$ may be removed, the arm B swung away from the rigid vertical arm A', and the bolt passed through the center perforation of the arm B, and through the slot in the arm A², which is concentric with the lower fastening bolt, to throw the shafts and pulleys in the position shown in Fig. 4, which is looking at the reverse side of the view shown in Fig. 3.

Figure 4:
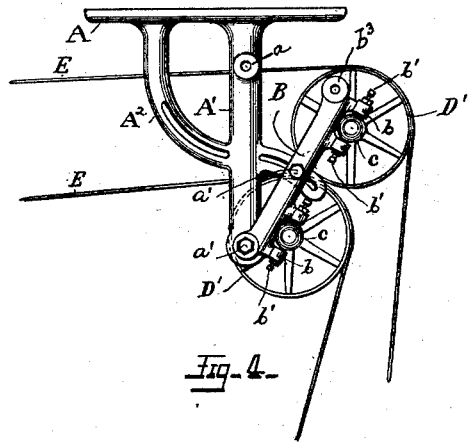

The view shown in Fig. 3 represents the belt E as passing from a main shaft hung underneath the floor timbers, around the guide pulleys and up to a machine on the floor above, while the view shown in Fig. 4 represents the belt passing from the same line shaft, over the guide pulleys, and downwardly to a counter shaft or machine situated on the floor beneath. In either case, it will be seen that the belt travels from the main line parallel with the floor of the building, and perpendicular either downwardly or upwardly to the machine or counter shaft to be driven, so that the space in the room is left free for the passage of the trucks and the material to be operated upon. It is evident, also, that the shaft mounted in the swinging end of the arms B may be moved nearer to or farther from the vertical stationary arm A' for the purpose of regulating the tension of the belt.

What I claim as new, and desire to secure by Letters Patent, is—

1. The combination of the rigid hangers, hanger bars pivoted at one end to said rigid hangers to permit the free end of said swinging hangers to be adjusted nearer to or farther from said rigid hanger, journal bearings carried by the swinging hangers, and means to rigidly secure the swinging hanger to the rigid hanger, substantially as shown and described.

2. The combination, substantially as hereinbefore set forth, of the rigid hanger consisting of the securing web A, vertical arm A' having perforated bosses, the curved arm A², having slots concentric with the upper and lower perforated bosses of the vertical arm, the swinging arm B having perforated bosses at its end, and lugs to receive and support shaft bearings, said arm being centrally perforated to register with the concentric slots in the curved arm A², the journal bearings fitted between the lugs of arm B, and the set screws to hold said bearings in position.

3. The combination of the fixed hanger, consisting of a securing web, the vertical arm, slotted curved arm and brace arm connecting the lower end of the slotted curved arm and lower end of the vertical arm, the swinging arm B secured by bolts at its upper and lower end to the vertical arm of the fixed hanger and having supporting lugs to receive the shaft bearings, and centrally perforated shaft bearings between the lugs of the swinging arm, and set screws passing through said lugs to align the bearings and hold them in the desired position, the shafts journaled in said bearings, and guide pulleys secured upon said shaft, substantially as and for the purpose set forth.

EDWIN A. HILL.

Witnesses:
J. C. ENOCHS,
A. C. ENOCHS.